US008475582B2

(12) United States Patent
Thiele et al.

(10) Patent No.: US 8,475,582 B2
(45) Date of Patent: Jul. 2, 2013

(54) PROCESS FOR MAKING A WATER DISPERSIBLE TITANIUM DIOXIDE PIGMENT USEFUL IN PAPER LAMINATES

(75) Inventors: Erik Shepard Thiele, Genolier (CH); John Davis Bolt, Mcewen, TN (US); Scott Richard Mehr, Dickson, TN (US)

(73) Assignee: E I du Pont de Nemours and Company, Wilmington, DE (US)

( * ) Notice: Subject to any disclaimer, the term of this patent is extended or adjusted under 35 U.S.C. 154(b) by 234 days.

(21) Appl. No.: 12/074,821

(22) Filed: Mar. 6, 2008

(65) Prior Publication Data

US 2008/0160267 A1 Jul. 3, 2008

Related U.S. Application Data

(62) Division of application No. 10/540,605, filed as application No. PCT/US03/41325 on Dec. 26, 2003, now abandoned.

(60) Provisional application No. 60/437,142, filed on Dec. 30, 2002.

(51) Int. Cl.
C09C 1/00 (2006.01)
B41M 3/10 (2006.01)
B44C 5/04 (2006.01)
G03G 7/00 (2006.01)
B32B 5/16 (2006.01)

(52) U.S. Cl.
USPC ........... 106/443; 106/438; 106/442; 106/444; 106/445; 106/446; 106/449; 428/211.1; 428/329

(58) Field of Classification Search
USPC .......... 106/443–446, 438, 449, 442; 428/329, 428/211.1; 423/610
See application file for complete search history.

(56) References Cited

U.S. PATENT DOCUMENTS

| 3,418,147 | A |   | 12/1968 | Fields |   |
|---|---|---|---|---|---|
| 3,523,809 | A |   | 8/1970 | Holbein |   |
| 3,853,575 | A |   | 12/1974 | Holle et al. |   |
| 3,926,660 | A | * | 12/1975 | Holle et al. | 106/430 |
| 3,946,134 | A | * | 3/1976 | Sherman | 428/403 |
| 4,052,224 | A |   | 10/1977 | Howard |   |
| RE30,233 | E |   | 3/1980 | Lane et al. |   |
| 4,239,548 | A |   | 12/1980 | Barnard et al. |   |
| 4,400,365 | A |   | 8/1983 | Haacke et al. |   |
| 4,599,124 | A |   | 7/1986 | Kelly et al. |   |
| 4,689,102 | A |   | 8/1987 | Prawdzik et al. |   |
| 5,114,486 | A |   | 5/1992 | Demosthenous et al. |   |
| 5,165,995 | A | * | 11/1992 | Losoi | 428/403 |
| 5,425,986 | A |   | 6/1995 | Guyette |   |
| 5,665,466 | A | * | 9/1997 | Guez et al. | 428/329 |
| 5,679,219 | A |   | 10/1997 | Harms et al. |   |
| 5,785,748 | A |   | 7/1998 | Banford et al. |   |
| 5,942,281 | A |   | 8/1999 | Guez et al. |   |
| 5,976,237 | A |   | 11/1999 | Halko et al. |   |
| 6,287,681 | B1 |   | 9/2001 | Mehta et al. |   |
| 6,290,815 | B1 |   | 9/2001 | Magnin et al. |   |
| 6,342,099 | B1 | * | 1/2002 | Hiew et al. | 106/443 |
| 6,395,081 | B1 | * | 5/2002 | Hiew et al. | 106/446 |
| 6,413,618 | B1 |   | 7/2002 | Parker et al. |   |
| 6,551,455 | B2 |   | 4/2003 | Johnson et al. |   |
| 6,599,592 | B1 |   | 7/2003 | Schulz |   |
| 6,706,372 | B2 |   | 3/2004 | Schulz et al. |   |
| 6,709,764 | B1 |   | 3/2004 | Perrin et al. |   |
| 6,761,979 | B2 |   | 7/2004 | Yokochi et al. |   |
| 6,783,631 | B2 |   | 8/2004 | Schulz |   |
| 6,962,622 | B2 |   | 11/2005 | Bender et al. |   |
| 7,166,157 | B2 |   | 1/2007 | Drews-Nicolai et al. |   |
| 2003/0138600 | A1 |   | 7/2003 | Dohring et al. |   |
| 2004/0025749 | A1 |   | 2/2004 | Drews-Nicolai et al. |   |
| 2007/0068423 | A1 |   | 3/2007 | Thiele |   |
| 2007/0071989 | A1 |   | 3/2007 | Thiele |   |
| 2008/0308009 | A1 |   | 12/2008 | Thiele |   |

FOREIGN PATENT DOCUMENTS

| EP | 0450805 A2 | 10/1991 |
| EP | 0753546 A2 | 1/1997 |
| GB | 1157318 | 7/1969 |
| GB | 1422575 | 1/1976 |
| JP | 62048775 | 3/1987 |
| JP | 62-48775 | 8/1993 |
| WO | WO2004/018568 A1 | 3/2004 |

OTHER PUBLICATIONS

Web page by Martin Hubbe: Mini-Encyclopedia of Papermaking Wet-End Chemistry, Jan. 25, 2002.*
PCT Search Report, Jul. 20, 2004.
Declaration of Erik Shepard Thiele.

* cited by examiner

Primary Examiner — Pegah Parvini

(57) ABSTRACT

The present invention relates to a process for making a titanium dioxide pigment consisting of titanium dioxide and single layer of inorganic surface treatment consisting of aluminum phosphate wherein the pigment is characterized by and isoelectric point which is greater than pH 6 and a negative zeta potential of at a pH of 7.5 or more.

6 Claims, No Drawings

PROCESS FOR MAKING A WATER DISPERSIBLE TITANIUM DIOXIDE PIGMENT USEFUL IN PAPER LAMINATES

CROSS REFERENCE TO RELATED APPLICATIONS

This application is a DIV of application Ser. No. 10/540,605 filed Jun. 27, 2005, now abandoned, which is a 371 of PCT/US03/41325 filed Dec. 26, 2003 which claims benefit of U.S. Provisional Application No. 60/437,142 filed on Dec. 30, 2002 incorporated by reference herein in its entirety.

BACKGROUND OF THE INVENTION

Titanium dioxide pigments are used in many applications. One particular application demanding light fastness is the use in paper incorporated into paper laminates for decorative applications.

In this application the titanium dioxide pigmented paper is saturated with a laminating resin and subjected to heat and pressure to produce a hard surface laminate in which oxygen is absent. The titanium dioxide on exposure to UV light tends to gray as the concentration of Ti3+ ions are produced without the continual conversion by air oxidation of the ions back to the Ti 4+ state.

Many techniques have been employed to make a light fast titanium dioxide pigment from the use of a calcination step in the pigment manufacture to the use of redox couples such as Ce2+/Ce4+ to keep the titanium ion in the colorless 4+ oxidation state. But the use of such oxidation couples may lead to a yellowing of the titanium dioxide. Calcination on the other hand adds time and cost to pigment manufacture.

In the present invention the objective was to find a noncolor producing method by which titanium dioxide pigment could be light stabilized. This was achieved by a process of precipitating a single layer coating of alumina phosphate on the surface of a titanium dioxide starting pigment. The product produced by the present process proved to be water dispersible and to exhibit a high retention in the paper making process.

Prior art methods of making a light fast titanium dioxide include U.S. Pat. Nos. 5,976,237; 5,785,748; 5,665,466; 4,400,365; and 3,853,575.

U.S. Pat. No. 5,976,237 to Halko et al. teaches a process for making durable pigments for plastics that may include a treatment step including a compound which is a source of $P_2O_5$. The Halko process requires that the pigment surface is first treated with alumina and silica and optionally another oxide such as a source of $P_2O_5$.

U.S. Pat. No. 5,785,748 to Banford et al. teaches the use of a prepared reagent that is a mixture of an aluminum compound and phosphoric acid prepared under heating. The source of the aluminum compound must be one that will dissolve in phosphoric acid. The aluminum compound is dissolved and the solution is clear, the mixture is diluted and added to a slurry of the titanium dioxide starting pigment. The pH is then adjusted to about 3.5 to 5 to precipitate the treatment on the pigment surface. For improved light fastness, a compound believed to be an oxidizing agent, such as potassium iodate, copper sulfate or potassium nitrate, is added in the process.

U.S. Pat. No. 5,665,466 to Guez et al. teaches a process for making a titanium dioxide of at least two layers. The first layer is an aluminum phosphate layer and the second is an aluminum oxide layer. The pigment is characterized by a positive zeta potential at high pH to ensure high physicochemical retention of the pigment in the paper.

U.S. Pat. No. 4,400,365 to Haacke et al. teaches a combination of aluminum and zinc phosphates as a means to increase titanium dioxide lightfastness, and U.S. Pat. No. 4,052,224 teaches a treatment of using compounds of phosphorus, aluminum, zirconium, titanium and silica to increase light fastness.

BRIEF SUMMARY OF THE INVENTION

The present invention is a process for making a water dispersible titanium dioxide pigment comprising:
(a) mixing dry titanium dioxide pigment with water to form a mixture having a pigment concentration of from about 14 to 40 weight percent based on the weight of the mixture then adjusting the pH of this mixture to about 7 with aqueous sodium hydroxide;
(b) heating the mixture from step (a) to a temperature of about 40° C.;
(c) adding to the mixture from step (a) simultaneously and at a rate such that the pH of the resulting mixture is maintained at about 7 throughout this step (c) from about 0.15 to 0.65 moles of phosphoric acid per kilogram of dry pigment and at least a portion of sodium aluminate aqueous solution required to react with the phosphoric acid to form aluminum phosphate;
(d) adding any remaining aqueous sodium aluminate solution required to react with unreacted phosphoric acid added in step (c) to complete the formation of aluminum phosphate simultaneously with a solution of hydrochloric acid wherein the rate of addition of aluminate solution and that of the acid solution is adjusted so that that the pH of the resulting mixture from and in this step (d) is maintained in a range from 5 to 8; and
(e) curing the mixture from step (d) for from about 10 to 30 minutes.

In step (c) of the present invention, the addition of aqueous sodium aluminate may be made so that the ratio of the moles of phosphorous added to the moles of aluminum added is from about 0.2 to 0.9; but it is more preferred to make the addition in step (c) of aqueous sodium aluminate is made so that the ratio of the moles of phosphorous added to the moles of aluminum added is from about 0.25 to 0.6, and most preferred that the addition of aqueous sodium aluminate is made so that the ratio of the moles of phosphorous added to the moles of aluminum added is about 0.5.

In the present invention, the amount of phosphoric acid added in step (c) may be from about 0.23 to 0.52 moles per kilogram of pigment; but is more preferred that the amount of phosphoric acid added in step (c) is about 0.40 moles per kilogram of pigment, and most preferred that the amount of phosphoric acid added in step (c) is about 0.44.

The present process may be varied and achieve the same result if in place of step (c), (i) first adding the phosphoric acid solution to the mixture from step (a) without the simultaneous addition of aqueous sodium aluminate, and then (ii) adding the solution of the sodium aluminate in an amount sufficient to raise the pH of the mixture from step (i) to a pH of about 7.

More particularly, the present process produces a light fast titanium dioxide pigment consisting of titanium dioxide and a single layer of inorganic surface treatment consisting of aluminum phosphate wherein the pigment is characterized by an isoelectric point which is greater than pH 6 and a negative zeta potential, for example, less than negative 20 mV, at a pH of 7.5 or more, from a rutile or anatase starting pigment particle. This pigment is characterized by an isoelectric point from about pH 5.4 to 6.7 and a zeta potential at pH=9.0 of less than negative 40 mV. Typically, the zeta potential at pH=9.0 is from negative 40 to negative 150. Preferably, the zeta potential at pH=9.0 is from negative 40 to negative 60. The starting pigment particles may be raw pigment, that is, a pigment particle has had no wet treatments applied to its surface before treatment according to the present invention, or the starting pigment particles may have undergone wet treatment. It is preferred that the starting pigment particle be raw pigment. If the starting pigment particles have undergone wet treatment, the wet treatment will typically involve treatments to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment. The present invention also relates to a titanium dioxide pigment consisting of titanium dioxide and single layer of inorganic surface treatment consisting of aluminum phosphate wherein the pigment is characterized by an isoelectric point which is greater than pH 6 and a negative zeta potential of less than negative 20 mV at a pH of 7.5 or more made by a process comprising:

(a) mixing dry titanium dioxide pigment with water to form a mixture having a pigment concentration of from about 14 to 40 weight percent based on the weight of the mixture then adjusting the pH of this mixture to about 7 with aqueous sodium hydroxide;

(b) heating the mixture from step (a) to a temperature of about 40° C.;

(c) adding to the mixture from step (a) simultaneously and at a rate such that the pH of the resulting mixture is maintained at about 7 throughout this step (c) from about 0.15 to 0.65 moles of phosphoric acid per kilogram of dry pigment and at least a portion of sodium aluminate aqueous solution required to react with the phosphoric acid to form aluminum phosphate;

(d) adding any remaining aqueous sodium aluminate solution required to react with unreacted phosphoric acid added in step (c) to complete the formation of aluminum phosphate simultaneously with a solution of hydrochloric acid wherein the rate of addition of aluminate solution and that of the acid solution is adjusted so that that the pH of the resulting mixture from and in this step (d) is maintained in a range from 5 to 8; and (e) curing the mixture from step (d) for from about 10 to 30 minutes.

In the present invention it is preferred that following step (e) the mixture is filtered and the pigment recovered and washed and dried then micronized at a temperature of from 200° C. and above. In one embodiment, the mixture is filtered and the pigment recovered and washed and dried then micronized at a temperature of from 200 to 420° C.

Pigment made according to the present invention is preferred for use in laminate papers and paper laminates.

DETAILED DESCRIPTION OF THE INVENTION

The present invention provides a titanium dioxide pigment for use in making paper laminates. Titanium dioxide pigment made according to the present invention forms a stable slurry of up to 80% by weight pigment through the use of pH adjustment alone without the addition of chemical dispersants, thus simplifying the slurry composition and reducing the cost of making the slurry. Typically, the slurries of the present invention will contain 30 to 80%, more preferably, 50 to 80%, and most preferably 70-80% by weight pigment. Stable slurries of the pigment of the present invention require a pH of just slightly more than 7.0 and typically about 7.8 for slurries having 80% by weight pigment. Pigment of the present invention is characterized by a large negative zeta potential at high pH. The pigment exhibits an isoelectric point less than about pH 6.2.

In the process of making paper laminates, laminate papers are made which usually contain titanium dioxide as an agent to enhance paper opacity and brightness. The titanium dioxide is first blended with water and dispersants such as citric acid, Rohm and Haas's Tamol brand dispersants or acidic dispersants to form a slurry. This slurry is then added to the furnace to be converted into paper. Pigment of the present invention may be loaded into the slurry at much higher concentrations than are currently available to paper makers. This is the case without incurring the cost or the need for adding a dispersant to the slurry.

The pigment surface treatment of the present invention ranges in composition from about 2.0-4% by weight P reported as $P_2O_5$ and about 4 to 6% by weight Al reported as $Al_2O_3$. More preferred is a composition from about 2.5-3.2% by weight P reported as $P_2O_5$ and about 4.6-5.4% by weight Al reported as $Al_2O_3$. The pigment of this invention has a negative zeta potential for example, less than negative 20 mV, at a pH of 7.5 or more. This pigment is characterized by an isoelectric point from about pH 5.4 to 6.7 and a zeta potential at pH=9.0 of less than negative 40 mV. Typically, the zeta potential at pH=9.0 is from negative 40 to negative 150. Preferably, the zeta potential at pH=9.0 is from negative 40 to negative 60.

Pigment according to the present invention may be made as follows:

1. Prepare a slurry of titanium dioxide in water by mixing 4 parts titanium dioxide by weight on a dry basis and adjust the pH of this slurry to 7 using sodium hydroxide. The amount of water in the slurry is not critical so long as it is fluid enough to provide good mixing as the treatment agents are added. For example, in a chloride titanium dioxide manufacturing process, oxidation reactor discharge slurry may be used as the slurry for treatment.

2. The additional materials required for the treatment are 2.05 parts of 85% by weight phosphoric acid, 6.66 parts of sodium aluminate solution at a concentration of 400 g per liter, and hydrochloric acid at a concentration of from 10-40% percent by weight HCl.

3. Heat the slurry from step 1, to about 40° C.

4. Simultaneously add the phosphoric acid and sodium aluminate solution at a rate to maintain the slurry pH at about 7 until all 2.05 parts of the phosphoric acid have been added to the slurry.

5. Simultaneously add the remaining sodium aluminate solution (the remainder of 6.66 parts) and the hydrochloric acid at such rates that the pH of the slurry from step 4 is maintained at 7. Continue this addition until all 6.66 parts of the sodium aluminate has been added.

6. Stir the mixture from step 5 for from 10 to 30 minutes.

Step 4 above may be accomplished alternatively by first adding all the required phosphoric acid (in this case 2.05 parts) and then adding sodium aluminate solution until the pH of the mixture is raised to 7. Steps 5 and 6 are carried out as described above.

The pigment from this process is water dispersible requiring no addition other than pH adjustment in order to form stable slurries of up to 80% solids and shows excellent light fastness as tested according to methods used in testing raw material used in laminate papers and in paper laminates. The method of making the laminate papers or paper laminates is not critical in the performance of the pigment of the present invention.

What is claimed is:

1. A process for making a water dispersible titanium dioxide slurry comprising:
   (a) mixing dry titanium dioxide pigment with water to form a first mixture having a pigment concentration of from about 14 to 40 weight percent based on the weight of the first mixture then adjusting the pH of this first mixture to about 7 with aqueous sodium hydroxide;
   (b) heating the first mixture of step a) to a temperature of about 40 C to form a heated first mixture;
   (c) adding to the heated first mixture about 0.15 to 0.65 moles of a phosphoric acid per kilogram of dry titanium dioxide pigment and a sodium aluminate aqueous solution to form a second mixture comprising aluminum phosphate, wherein the phosphoric acid and the sodium aluminate aqueous solutions are added to the heated first mixture at a rate such that the pH of the second mixture is maintained at about 5 to 8;
   (d) curing the second mixture for about 10 to 30 minutes to form a cured mixture;
   (e) filtering the cured mixture and recovering, washing, drying, and fluid energy milling a treated titanium dioxide pigment consisting of a coating consisting of aluminum phosphate;
   (f) blending the treated titanium dioxide pigment consisting of a coating consisting of aluminum phosphate with water to form a third mixture;
   (g) adjusting the pH of the third mixture to form a slurry wherein the slurry comprises 70 to 80 percent by weight of the treated titanium dioxide pigment consisting of a coating consisting of aluminum phosphate based on the weight of the slurry.

2. The process of claim 1 wherein in step (c) the addition of the sodium aluminate aqueous solution is such that the ratio of the moles of a phosphorous to the moles of an aluminum in the second mixture is from about 0.25 to 0.6.

3. The process of claim 1 wherein in step (c) the addition of the sodium aluminate aqueous solution is such that the ratio of the moles of phosphorous to the moles of aluminum in the second mixture is about 0.5.

4. The process of claim 1 wherein the amount of the phosphoric acid added in step (c) is from about 0.23 to 0.52 moles per kilogram of the dry titanium dioxide pigment.

5. The process of claim 1 wherein the dry titanium dioxide pigment is rutile.

6. A slurry produced from the process of claim 1.

* * * * *